United States Patent [19]

Wormgoor

[11] Patent Number: 4,620,504
[45] Date of Patent: Nov. 4, 1986

[54] SLIP INCUBATOR FOR A CHICKEN BROODER PLANT

[75] Inventor: Arend J. Wormgoor, Diepenheim, Netherlands

[73] Assignee: A. J. Wormgoor B.V., Diepenheim, Netherlands

[21] Appl. No.: 755,940

[22] Filed: Jul. 16, 1985

Related U.S. Application Data

[63] Continuation of Ser. No. 616,306, Jun. 1, 1984, Pat. No. 4,546,729.

[30] Foreign Application Priority Data

Jun. 9, 1983 [DE] Fed. Rep. of Germany ....... 3320815

[51] Int. Cl.⁴ .............................................. A01K 41/00
[52] U.S. Cl. ......................................... 119/35; 119/37
[58] Field of Search .................. 119/35, 37, 18, 22

[56] References Cited

U.S. PATENT DOCUMENTS

| | | | |
|---|---|---|---|
| 2,997,021 | 8/1961 | Bailey | 119/37 |
| 3,147,738 | 9/1964 | Theilig | 119/43 |
| 3,396,703 | 8/1968 | Trussell | 119/37 |
| 3,820,507 | 6/1974 | Dugan et al. | 119/35 |
| 3,923,006 | 12/1975 | Dugan et al. | 119/37 |
| 4,020,793 | 5/1977 | Morrison | 119/18 |

FOREIGN PATENT DOCUMENTS 944825  4/1954  Fed. Rep. of Germany.
2433460  2/1975  Fed. Rep. of Germany.

*Primary Examiner*—Hugh R. Chamblee
*Attorney, Agent, or Firm*—Merchant, Gould, Smith, Edell, Welter & Schmidt

[57] ABSTRACT

The invention relates to an arrangement for the operation of a chicken brooder plant with trestles for accommodating the eggs to be incubated arranged on a cart, said trestles being arranged in several tiers over one another in a cart, with the carts being conveyed continuously through a brooding oven with ventilation of the individual trestles being accomplished over one half the path of the cart from one side of the cart, and on the other half of the path of the cart from the other side of the cart. Furthermore, the invention concerns a slip incubator with a slip incubator cart capable of traveling inside the slip incubator, and with circulating conveyor belts arranged on the slip incubator cart.

3 Claims, 7 Drawing Figures

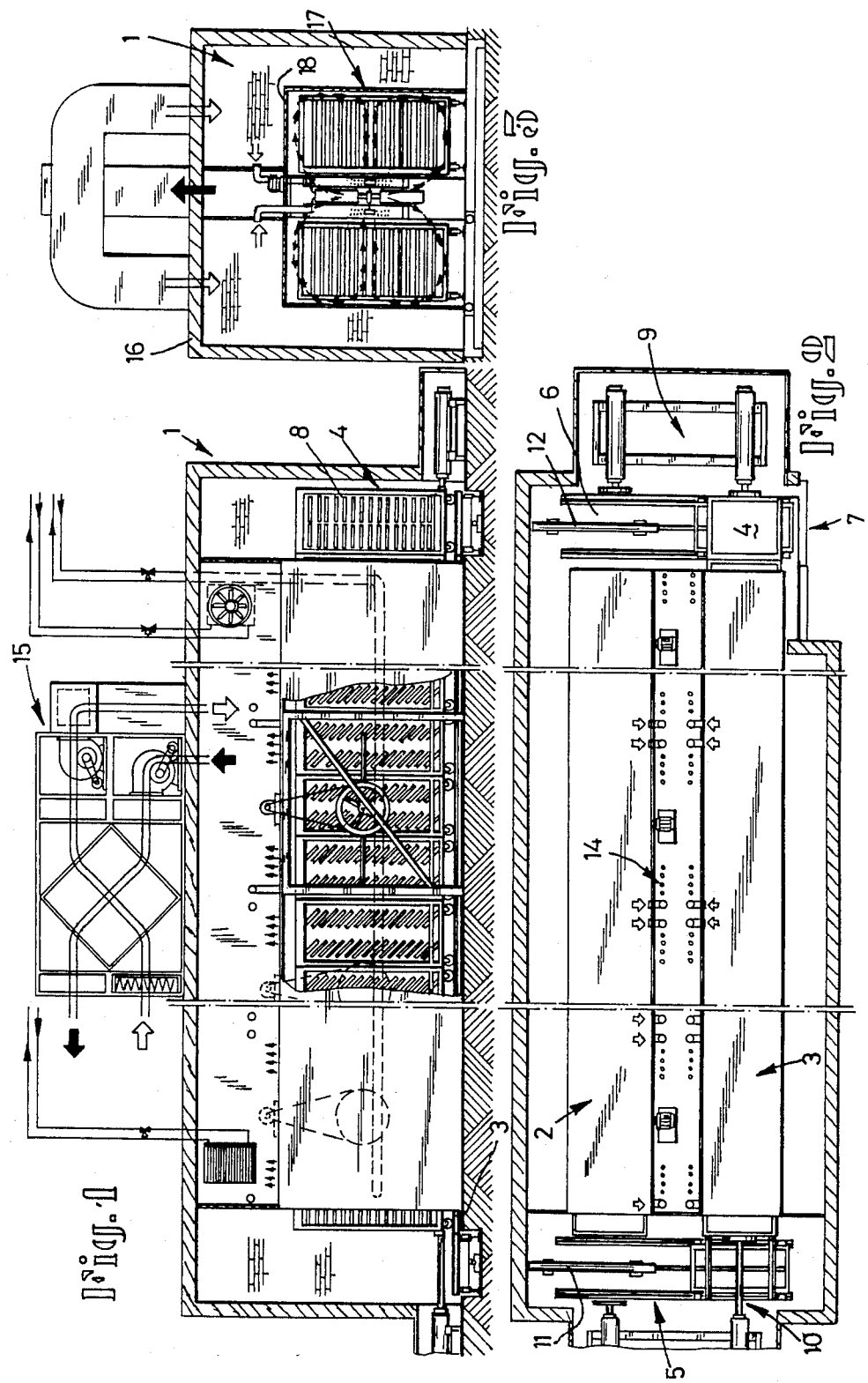

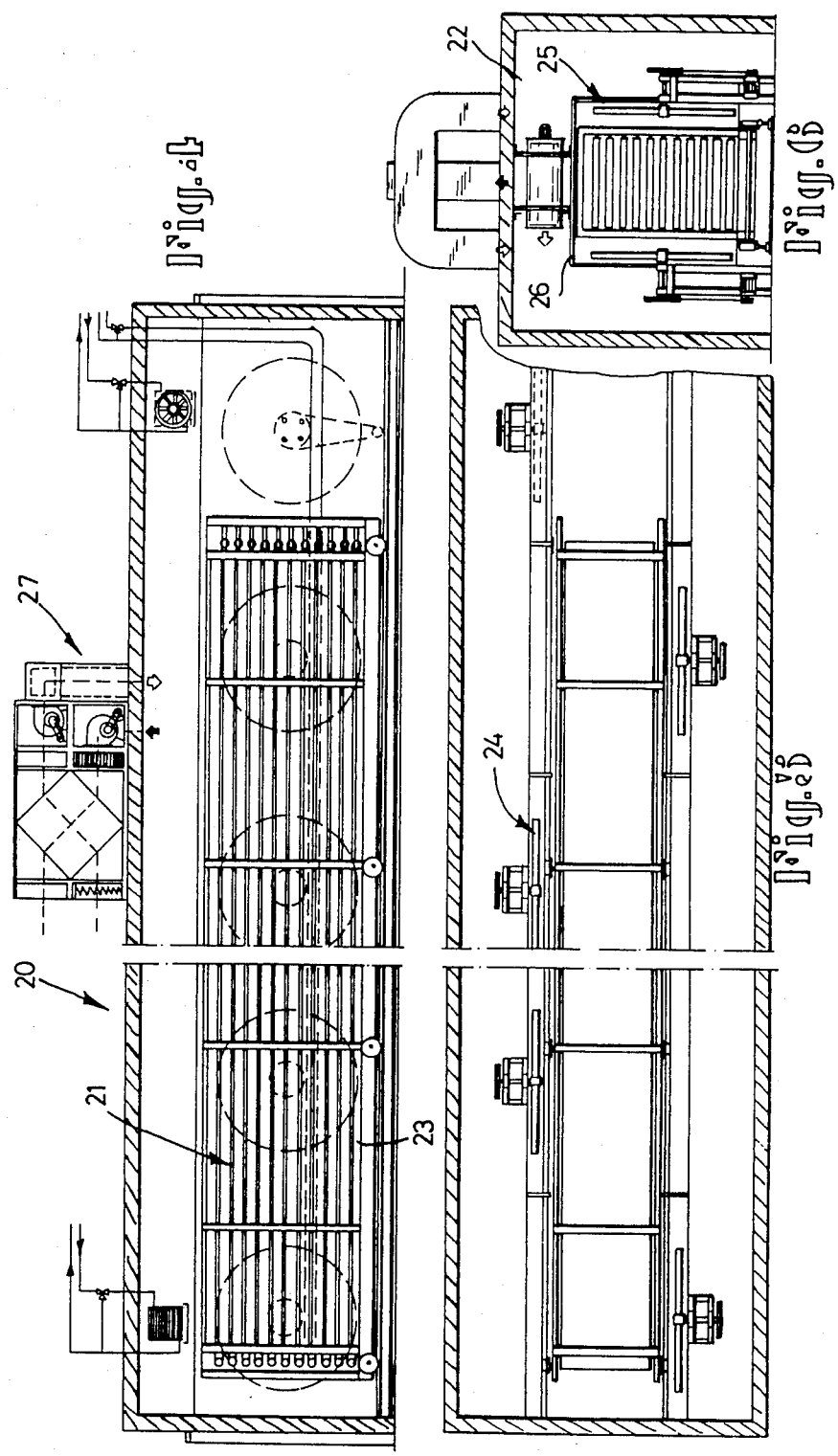

SLIP INCUBATOR FOR A CHICKEN BROODER PLANT

This is a continuation of application Ser. No. 616,306, filed June 1, 1984, now U.S. Pat. No. 4,546,729.

BACKGROUND OF THE INVENTION

The invention concerns an arrangement for the operation of a chicken brooder plant in accordance with the precharacterizing clause of the principal claim.

Chicken brooder plants are known. Usually, these types of plants work with a brooder oven into which can be driven the racks loaded with the eggs to be hatched, which can be constructed as carts. All known machines have the disadvantage that they display a very high cost for energy and very high energy losses, and that servicing them is extraordinarily work-intensive, very often requiring working inside the brooder oven where temperatures inside the brooder ovens in the magnitude of 37 to 39 degrees C. prevail.

One species-forming arrangement is described in U.S. Pat. No. 4,005,679. In the case of this known arrangement, the entire oven chamber is heated uniformly and, in order to take into account a balancing of the exothermal and endothermal reaction of the eggs, each cart is loaded with eggs displaying the same brooding age so that, contained in the brooder oven are carts whose incubation process is driven to different extents. A good heat equalization between the individual carts is said to be brought about by this arrangement. By an arrangement of this type—which has never proven itself in practice—no extensive heat equalization between the individual eggs is brought about, whereby it is likewise not possible to obtain within the relatively large ovens a sufficient temperature equalization by means of heating and ventilating apparatus.

SUMMARY OF THE INVENTION

Starting out from this known species-forming arrangement, the task underlying the invention is to improve this arrangement from this point, such that the entire amount of heat inside the actual brooder oven and inside the actual carts becomes more equalized.

Proposed for this in accordance with the invention is that the guideways be arranged on both sides and/or round about the ventilating and warming apparatus and that the individual trestles or trestle groups be loaded inside the individual carts with eggs having progressed to a different extent relative to the incubation process.

Hence, while in the known contrivance, a cart is fed into the plant, which, as seen over its entire height, carries eggs of the same age, and this cart then being removed in-toto from the plant after carry-out the incubation process, hence after approximately 15 to 18 days, and the thusly initially incubated eggs being guided to the slip system, the invention proposes that the cart remain in the plant, only individual trestles being taken out of this cart and fed to the slip system, and these empty spaces then again being loaded with new trestles and the cart running about further in the plant.

Therefore, proposed and achieved by the invention is a basically different system such that there is obtained an essentially more uniform heating of the entire egg inside of a cart and, thereby, better handling of each individual egg.

Independently of the thusly obtained better heat utilization, also achieved in the case of the plant in accordance with the invention is that no cart needs to be taken out of the brooder oven, such as is required in the case of the apparatus in accordance with U.S. Pat. No. 4,005,679, the appropriately heated cart remaining, rather in the plant and all that is required in setting in the new trestles into these warm carts.

In the case of carts that are outfitted with 15 trestles over one another, it is now possible to load each three trestles, i.e. three tiers, with eggs of like age, so that, with circulating passthrough of the cart, provided inside the one cart are five tiers of trestles displaying different age eggs. Achieved by this arrangement is that the intrinsic heat of the eggs developed after about 8 days, as seen over the entire cart, can be advantageously utilized.

Due to the fact that there ensues ventilation and, therewith, heating of the eggs out from two sides of the trestles, assured is not only that a sufficient supply of oxygen and heat is fed to each egg, it rather being simultaneously possible also to prevent drying out of the eggs by the previously, frequently required "overventilation" of the eggs or tiers, i.e. the moisture content of the air and of the eggs can be better controlled.

Hence, in basic difference to the previously known procedure, proposed by the procedure in accordance with the invention is a continuous throughpass of the carts through a brooder oven, whereby the individual carts display eggs of a different age in the individual tiers, so that there is provoked good intrinsic heat maintenance of the carts and, additionally, ventilation of the carts ensues not only over the entire period of time of incubation out from one side only, but rather the cart is ventilated out from both sides but with a relatively lesser mechanical expense being required. Additionally, the plant in accordance with the invention is built essentially smaller than the previously known plants with the same output capability.

The invention also involves itself with the construction of the actual oven chamber of the brooder oven and proposes for this, in resolution of the task underlying the invention, that the actual brooder oven consist of a heat-insulated oven chamber within which is disposed the actual passthrough oven, whereby the passthrough oven, i.e. the actual brooder oven, is separated from the internal space of the inner chamber, for example by sheetmetal walls, i.e. by walls made of good heat conducting material, so that there is achieved a good temperature balancing between the brooder oven and the oven chamber, whereby control of heat to the actual brooder oven is essentially simplified.

Finally, the invention involves itself with a slip incubator in accordance with claims 7 to 10.

Advantageous developments of the invention are defined in the subclaims.

BRIEF DESCRIPTION OF THE DRAWINGS

Examples of embodiment of the invention will be explained in the following with the aid of drawings. Here, the drawings show:

FIG. 1 is a side view, partially cut, onto an oven installation in accordance with the invention.

FIG. 2 is a schematic top view onto the oven installation in accordance with the invention.

FIG. 3 is a cut through the oven for clarifying the structure of the inside of the oven chamber.

FIG. 4 is a slip incubator adjoining the brooder oven, in a side view, partially cut.

FIG. 5 is a top view onto the arrangement in accordance with FIG. 4.

FIG. 6 is a cut through an oven chamber of the slip incubator.

DETAILED DESCRIPTION

Figure 7:
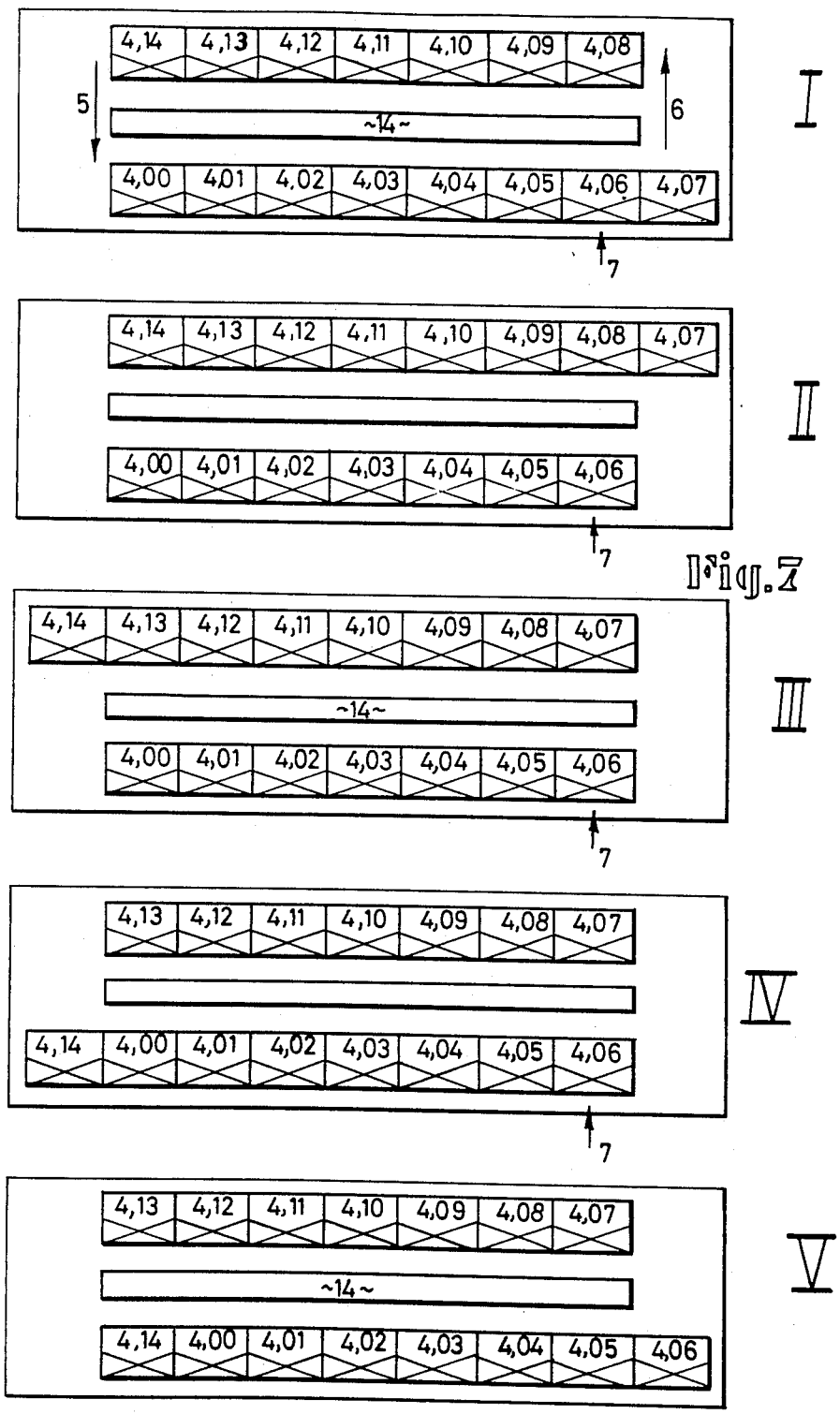
FIG. 7 is a "displacement plan" for the cart.

Designated with 1 in the drawings is an oven chamber in which are disposed two guideways 2 and 3, aligned parallel to one another, for cart 4. The guideways 2 and 3 consist, for example, of simple rails on which the cart can travel by means of track wheels. Disposed at the end of the guideways 2 and 3 that are disposed parallel to one another are transverse conveyor sections 5 and 6 that enable a changeover of the cart coming from guideway 3 over to guideway 2 and/or a changeover of the cart coming from guideway 2 over to guideway 3. Provided at the head end of the guideway 3 and at the corresponding end of the transverse conveyor section 6 is a loading and discharging arrangement 7, in which the carts can be loaded with eggs.

In the case of the example of embodiment illustrated, each cart carries fifteen trestles 8 disposed over one another, of which two trestle rows are disposed next to each other. The trestles 8 are pivotably journaled about axles that are aligned, with their longitudinal axis, transversally to the conveying direction of the cart on guideways 2 and 3.

Forward movement of the cart on the guideways 2 and 3 is accomplished, e.g. via hydraulic pressure mechanisms 9 and 10, i.e. one each cart 4 is, for example, pushed onto the conveyorway 3 by the hydraulic pressure mechanism 9. By means of the pressure then exerted on the next cart, the aforesaid cart is conveyed to the oven, over the conveyorway 3 to the transverse conveyor section 5, then guided here by means of appropriate transverse conveying apparatus 11, to the head end of the conveyorway 2 and, here, again pushed by means of the hydraulic pressure mechanism 10 onto the conveyorway 2 and guided through the oven, up to the point where this cart arrives at the transverse conveying section 6 where it arrives, over an appropriate conveyor mechanism 12, to the loading and discharging arrangement 7.

Both conveyorways 2 and 3 are some distance apart, but arranged parallel to one another and provided in the free space between the two conveyorways formed thereby are ventilating and heating apparatus 14. As is shown by FIG. 3, warm air is supplied through this ventilating and heating apparatus 14 through the trestles of the cart, and then sucked out. Effected by offsetting the cart over the transverse conveyor sections 5 and 6 is that each cart is appropriately ventilated and heated out from each of its longitudinal sides toward the passthrough walling of the oven. Also capable of resulting from this is an appropriate supplying of moisture, and capable of being recognized is that the cart, in contrast to previously known contrivances, can be sufficiently ventilated and heated from all sides with relatively lower air velocity (that reduces the danger of drying out the eggs).

Possible of being provided above the actual oven chamber 1 is a heat recovery system 15.

The individual trestles 8 of each cart 4 are subdivided, in the case of the procedure in accordance with the invention, into tiers, whereby three trestles form one tier unit, so that in the case of 15 trestles five different tier units are obtained, which are loaded with eggs of different ages so that, in this fashion, the warming up process inside of a cart, with recovery of the resulting intrinsic heat during the incubation process of the eggs, is better utilized than in the case of previously known procedural methods.

Capable of being recognized in FIG. 3 is that the actual oven chamber consists of an insulated external housing 16 and that disposed in the oven chamber 1 is the actual brooder oven 17, which is constructed as a passthrough oven, with the brooder oven 17 being separated from the inside of the oven chamber by walls 18 made of good heat conducting materials, so that the inside of the oven chamber 1 acts as a heat buffer outside of the brooder oven 17, which simplifies and refines controlling heat maintenance inside the brooder oven 17.

Illustrated in the drawings with solid arrows are the exhaust air streams and with the outline arrows the warm air steams.

The sensors, driving mechanism and fans along with conveyor lines that are required for operation of the plant are not, in part, illustrated and not explained any further for reasons of clarity in the drawing.

Illustrated in FIG. 7 is a displacement plan clarifying the method of function of the plant in accordance with the invention.

The individual carts are designated with the reference numbers 4,00 to 4,14. The two transverse conveyor sections bear the reference numbers 5 and 6, and disposed in the middle of the two rows of carts is the ventilating and heating apparatus 14. Capable of being recognized at 7 in FIG. 7 is the loading and discharging station.

In phase I, the cart 4,07 is located in the region of the transverse conveyor section 6 and is moved by the conveyor mechanism 12 illustrated in FIG. 2 into the position illustrated in FIG. 7 as phase III.

Then, in phase II, the entire row of carts, consisting of carts 4,07 to 4,14, is moved forward by one cart length by means of the hydraulic pressure mechanism 9, and by this means arrives into the position shown as phase III in FIG. 7. Now, the cart 4,14 is moved from this position, via the transverse conveyor section 5, i.e. the transverse conveyor mechanism 11, into the position illustrated as phase IV in FIG. 7. Next, there follows a push forward via the hydraulic pressure mechanism 10, so that the entire row of carts 4,14 to 4,06 is moved into phase V illustrated in FIG. 7.

Capable of being recognized from the displacement plan in FIG. 7 is that the carts always remain in the brooder oven, therefore no cart is totally removed from the brooder oven, the completely incubated trestles being removed rather only in the region of the loading and discharging arrangement 7, and trestles with fresh eggs being put in in their stead. There then follows a steady circulation of the cart.

Illustrated in FIG. 4 is a so-called slip incubator that adjoins the brooder oven. The slip incubator bears the reference 20. It displays a slip incubator cart 21 that is capable of travelling to and fro in an oven chamber, in order, therewith, to achieve a good and uniform ventilation and heating of the eggs and/or the chicks. The cart 21 displays a plurality of passthrough circulating conveyor belts 23 disposed over one another, over the entire length of the slip incubator cart 20, onto which are deposited the eggs incubated in the pre-incubator, which are then guided on the so-called slip incubator cart 21 for slipping out the chicks.

Disposed on both sides of the slip incubator are the fans 24 serving for supplying air, which maintain the correct, desired temperature inside the slip incubator cart 21.

In the case of this form of embodiment also, the oven chamber 22 is constructed in two parts, with the slip incubator oven 25 being arranged inside an individual chamber that is provided inside the oven chamber 22, and that are separated from the oven chamber by walls consisting of good conductive materials. Particularly, the actual slip incubator oven (25) is arranged inside a heat insulated oven chamber (22), with the actual slip incubator oven (22) being separated from the inner space of the insulated oven chamber (22) by a tunnel-form jacket (26) made of good heat conducting sheet metal or the like.

Also achieved here is the buffer action that was explained previously with the aid of oven chamber 1 and FIG. 3.

The slip incubator arrangement illustrated in FIGS. 4 to 6 also enables an individual loading of the individual conveyor belts with eggs, so that a good and economical temperature maintenance is guaranteed. Represented here also, above the actual oven chamber 22, is a heat recovery system 27. By use of the conveyor belts 23, possible is a simple removal of the chicks that have been slipped out, and, indeed, individually from each individual conveyor belt 23.

What is claimed is:

1. A slip incubator (20) for a chicken brooder plant, said slip incubator (20) adjoining a brooder oven (17) and comprising:
    a heat insulated oven chamber (22) inside of which an actual slip incubator oven (25) is arranged, said actual slip incubator oven (25) being separated from the inner space of said insulated oven chamber (22) by a tunnel-form jacket (26) made of good heat conducting sheetmetal or the like;
    a slip incubator cart (21) capable of traveling to and fro inside said oven chamber (22), said slip incubator cart (21) including a plurality of circulating conveyor belts (23) disposed over one another over the entire length of the slip incubator cart (21), said slip incubator cart (21) surrounded alongs its path of travel inside said oven chamber (22) by said tunnel-form jacket (26) made of good heat conducting sheetmetal or the like.

2. An arrangement according to claim 1, including fans (24) arranged to either side of said slip incubator cart (21) that is capable of traveling in said slip incubator oven (25).

3. An arrangement according to claim 2, wherein said fans (24) lying opposing one another are disposed with spacing between them.

* * * * *